(12) United States Patent
Piesinger

(10) Patent No.: US 8,717,963 B2
(45) Date of Patent: May 6, 2014

(54) SYNCHRONIZED WIRELESS COMMUNICATION NETWORK METHOD AND APPARATUS

(71) Applicant: Gregory Hubert Piesinger, Cave Creek, AZ (US)

(72) Inventor: Gregory Hubert Piesinger, Cave Creek, AZ (US)

(*) Notice: Subject to any disclaimer, the term of this patent is extended or adjusted under 35 U.S.C. 154(b) by 0 days.

(21) Appl. No.: 13/751,094

(22) Filed: Jan. 27, 2013

(65) Prior Publication Data

US 2014/0044009 A1 Feb. 13, 2014

Related U.S. Application Data

(60) Provisional application No. 61/742,346, filed on Aug. 8, 2012.

(51) Int. Cl.
*H04W 4/00* (2009.01)
(52) U.S. Cl.
USPC ........... 370/314; 370/321; 370/330; 370/337; 370/347; 370/442

(58) Field of Classification Search
USPC ......... 370/312, 314, 319–321, 328–330, 337, 370/347, 441, 442, 458
See application file for complete search history.

(56) References Cited

U.S. PATENT DOCUMENTS

| 6,240,073 B1* | 5/2001 | Reichman et al. ............ 370/319 |
| 2001/0001616 A1* | 5/2001 | Rakib et al. .................... 375/259 |
| 2007/0195862 A1* | 8/2007 | Stafford et al. ............... 375/147 |
| 2010/0085954 A1* | 4/2010 | Keshavarzian et al. ....... 370/343 |
| 2012/0050100 A1* | 3/2012 | Huang et al. ............. 342/357.31 |

* cited by examiner

*Primary Examiner* — Alvin Zhu

(57) ABSTRACT

A wireless star topology communication network is implemented in which a centrally located access point supports a very large number of fixed location nodes distributed over a large metropolitan area. Communication is by direct sequence spread spectrum modulating m-ary quadrature amplitude modulation symbols. The access point and all nodes are synchronized using GPS or other means to prevent data collisions. Multiple access is primarily based on signal propagation time between the access point and a node which allows nodes at different ranges to use the same direct sequence code.

18 Claims, 15 Drawing Sheets

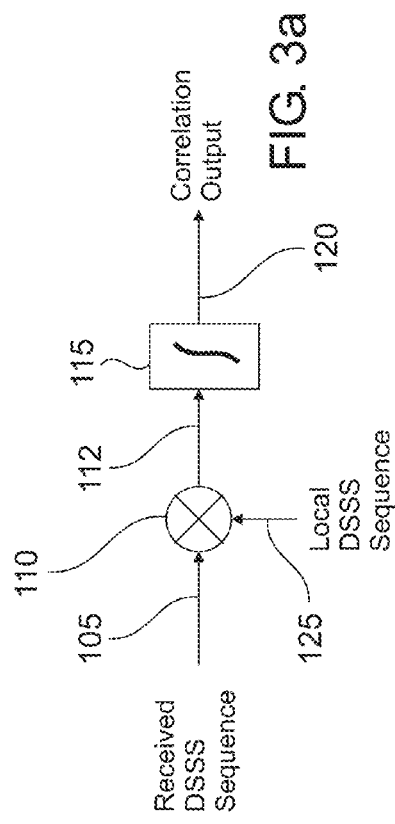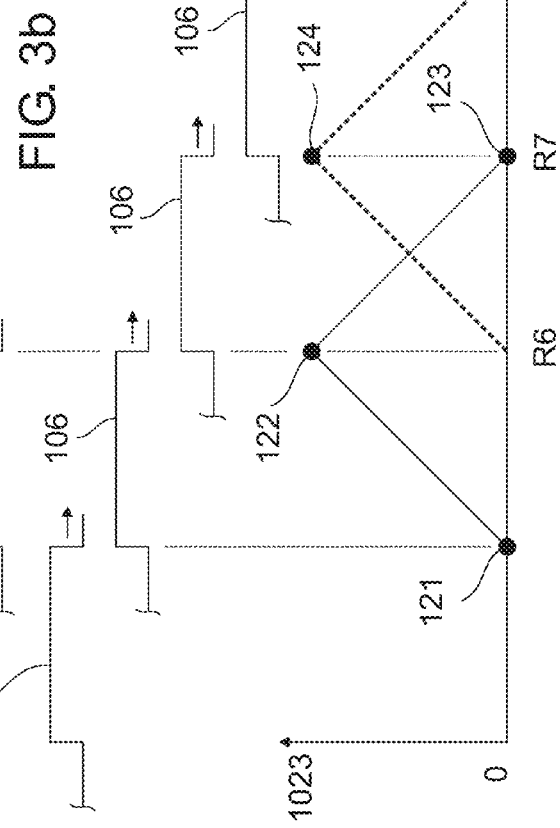

SYNCHRONIZED WIRELESS COMMUNICATION NETWORK METHOD AND APPARATUS

RELATED INVENTION

The present invention claims priority under 35 U.S.C. §119(e) to: "Synchronized Wireless Communication Network Method and Apparatus," Provisional U.S. Patent Application Ser. No. 61/742,346, filed 8 Aug. 2012, which is incorporated by reference herein.

U.S. Pat. No. 8,098,773 "Communication Method and Apparatus" is also incorporated herein by reference.

TECHNICAL FIELD OF THE INVENTION

The present invention relates to the field of communications. More specifically, the present invention relates to a star topology wireless communications network in which a central hub and connected nodes are all synchronized using GPS or other network timing.

BACKGROUND OF THE INVENTION

This invention primarily addresses a wireless wide area star topology communication network in which a centrally located hub or access point services a large number of nodes at fixed locations. A typical example of such a communication network is where a single or small number of access points communicate with a very large number of utility meters or Smart Grid nodes distributed across a large metropolitan area.

Currently, a large variety of network structures have been designed for the Smart Grid and other similar applications. The most popular networks operate in one of the shared Industrial, Scientific and Medical (ISM) radio frequency bands and use either a mesh or star topology. Essentially all current networks are based on a single or combination of the Code Division Multiple Access (CDMA), Time Division Multiple Access (TDMA), or Frequency Division Multiple Access (FDMA) techniques.

One of the biggest challenges of all these networks is how to handle data collisions caused when more than one node attempts to communicate with the central access point at the same TDMA time, on the same FDMA frequency, or using the same CDMA code. Numerous protocols have been developed over the years on how the nodes and access point should respond when collisions occur. Other challenges include how nodes initially acquire and maintain system timing when joining the network.

In solving these problems, the resulting implemented network structure is typically quite rigid in its capabilities. All nodes tend to be limited to approximately the same data rate and range performance and that performance may decrease as additional users are added. This is a major handicap in that once the network is designed and installed, it is not possible to easily upgrade or change its performance.

Accordingly, it is the object of the present invention to disclose methods and apparatus which provide a new and improved wireless network structure that solves these and other problems and allows the data rate of each node to be programmable. This feature allows each node to be matched to the communication needs required at its location and allows a single network to service many different communication requirements of a utility or other user. Currently, multiple different systems are typically required to service these varying requirements.

SUMMARY OF THE INVENTION

Briefly, to achieve the desired object of the present invention, a star topology wireless communication network is implemented by modulating communications message data using M-ary Quadrature Amplitude Modulation (M-QAM). These M-QAM message symbols are then spread using Direct Sequence Spread Spectrum (DSSS) modulation. The network timing and frequency of the central access point and all nodes is synchronized using the Global Positioning System (GPS) or other network timing.

Message data is formatted into a fixed length message packet. A periodic time slot period is defined during which this message packet wireless communication occurs. Multiple access during each time slot is based on signal propagation time between a node and access point, DSSS code, transmission frequency, and antenna beamwidth. This combination of multiple access techniques allow a very large number of nodes to communicate with a single access point without collisions.

Using GPS for synchronization eliminates the network timing, acquisition, collision, and retransmission problems of current systems. Different network nodes can provide different data rates using the same bandwidth by selecting higher or low-er order QAM modulations (M-QAM). Different node sensitivities, multiple access users, and data rates can be selected by using different DSSS codes and code lengths. These features allow different nodes to support different communication requirements on the same network.

Other objects and advantages of the present invention will become obvious as the preferred embodiments are described and discussed below.

BRIEF DESCRIPTION OF THE DRAWINGS

FIGS. 3A and 3B show a DSSS demodulator and its correlation output as a function of code chip offsets.

DETAILED DESCRIPTION OF THE PREFERRED EMBODIMENTS

The primary goal of the present invention is to provide a new and improved wireless network structure that supports a very large number of fixed nodes distributed over a large geographical area such as a large city. The sensitivity and data rate of each node is programmable so that different nodes can be individually configured over the air to accommodate changes in the node's communication requirements.

Figure 1:
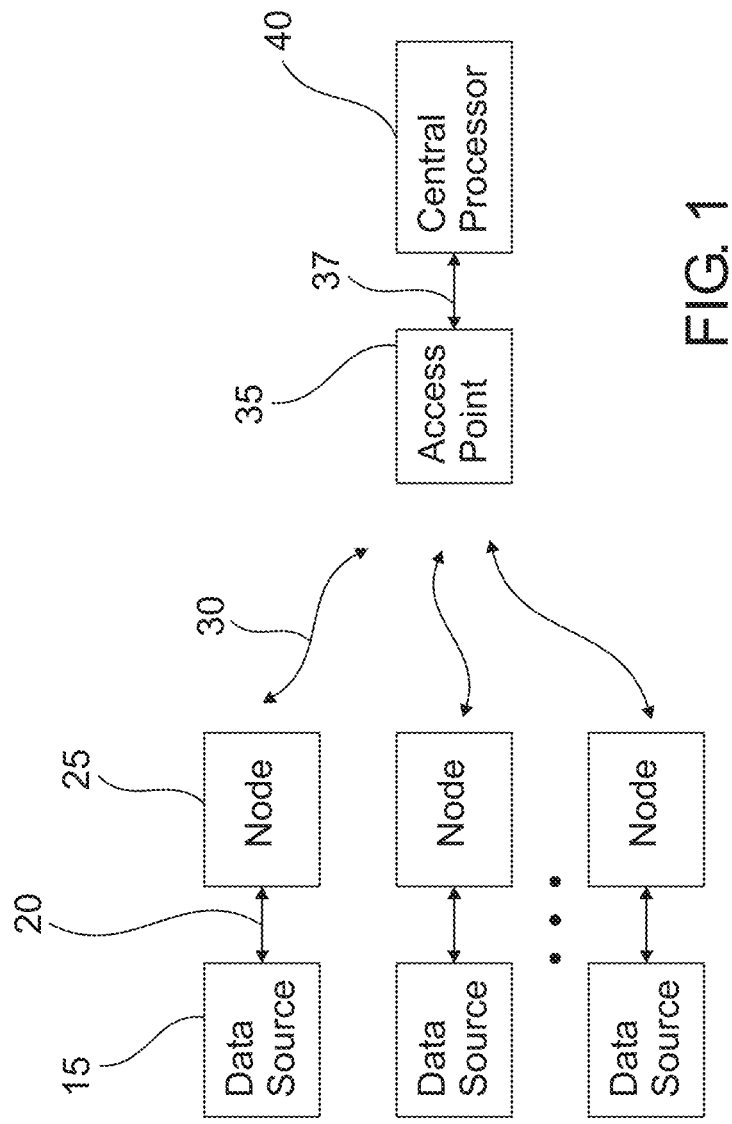
FIG. 1 shows a block diagram of a star topology wireless network.

A wireless network block diagram of the present invention is illustrated in FIG. 1. Each node 25 communicates over wireless link 30 in a star topology to access point 35. Data source 15 provides data input/output 20 for node 25 that will be sent/received by nodes 25 over wireless link 30 to access point 35. Central processor 40 receives and generates all node 25 data, controls node 25 and access point 35 configurations, and communicates with access point 35 over communication link 37. Central processor 40 can either be co-located with access point 35 or located at some other location. If located remotely, communication link 37 could be a microwave, fiber, coaxial, or any other high speed communication link.

Data source 15 can represent a hard wired connection or a variety of short range wireless connections such as Bluetooth, Wi-Fi, or ZigBee. For example, data source 15 might represent a nearby smart meter that uses ZigBee to communicate over ZigBee wireless link 20 to node 25. Bluetooth or Wi-Fi communications might be used by other data sources 15 to communicate with node 25. A compatible Bluetooth, Wi-Fi, or ZigBee module will be mounted either internally or externally in node 25 as required to communicate with these wireless data sources.

Figure 2:
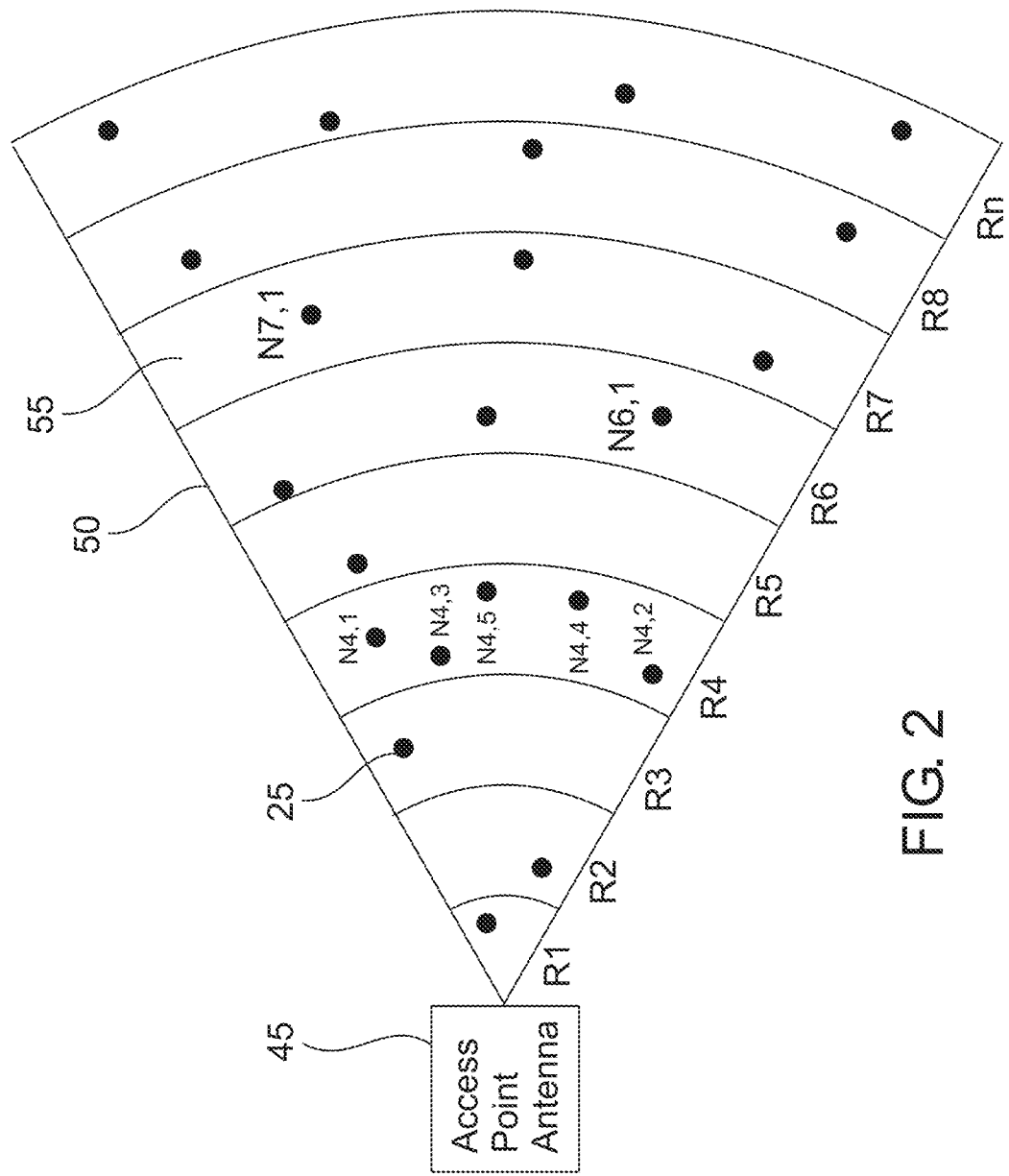
FIG. 2 shows an access point antenna beam pattern, range rings, and a plurality of nodes.

FIG. 2 illustrates access point antenna 45 and a plurality of nodes 25 scattered over a wide geographical area. Access point antenna 45 is typically mounted at an elevated location such as on a hilltop, tall building, tall tower, etc so as to be in line-of-sight communication with many of the fixed nodes. Antenna 45 has beam pattern 50 which is divided into equally distant range rings 55. The separation between range rings 55 in both propagation time and propagation distance is 1 DSSS chip. For example, if a 1 MHz DSSS chip rate is used, the range ring separation is 1 microsecond in propagation time and 300 meters in propagation distance.

Range rings are numbered Ri where the range ring closest to access point antenna 45 is R1, the second range ring is R2, and Rn is the furthest range ring in the network service area. Nodes are numbered Ni,j where i represents the range ring number in which the node is located and j represents the node number in that range ring. The first node installed in the forth range ring would be numbered N4,1. If the forth range ring held 5 nodes, the last node would be N4,5 as illustrated in FIG. 2.

DSSS modulation is well known. With standard DSSS modulation, each M-QAM data symbol is spread by multiplying it with a Pseudo Random Noise (PN) code sequence. For example, each data symbol might be multiplied by a 1024-bit length PN code sequence operating at a 1 MHz bit rate in which each PN code bit (chip) is 1 microsecond wide.

FIG. 3a illustrates a functional block diagram for the demodulation of a data symbol that was spread using a PN code sequence. The actual circuit can be implemented for either non-coherent or coherent demodulations as is well known by those skilled in the art. Received DSSS sequence 105 is cross correlated with stored local DSSS sequence 125 using correlator 110. Correlator 110 output 112 is accumulated over the length of stored local DSSS sequence 125 using integrator 115 to produce correlation output 120.

FIG. 3b illustrates correlation output 120 for different DSSS offset positions for maximal length sequences (m-sequences). For node N6,1 centered in range ring R6 as illustrated in FIG. 2, assume its local DSSS sequence 125 is identical to received DSSS sequence 105. Also assume local DSSS sequence ending chip 126 is aligned in propagation time and distance with the center of range ring R6 as illustrated in FIG. 3b, received DSSS sequence ending chip 106 is aligned one chip prior to local DSSS sequence ending chip 126, and propagation of received ending chip 106 is from left to right. For this alignment, correlation output 120 value point 121 is equal to 1. That is, since the two m-sequences do not line up, their cross correlation is −1 as is well known by those skilled in the art.

As the offset between ending chips 126 and 106 becomes less than 1 chip, correlation output 120 starts to increase. Peak correlation occurs upon perfect alignment and correlation output 120 value point 122 is equal to 1023 for a 1024-bit long PN code m-sequence. As received DSSS sequence ending chip 106 propagates past local DSSS sequence ending chip 126, correlation output 120 decreases and again becomes −1 (value point 123) when the offset between the two DSSS sequences equals 1 or more chips.

Also illustrated in FIG. 3b is the correlation output for node N7,1 centered in range ring R7 assuming its local DSSS sequence ending chip is aligned in propagation time and distance with the center of range ring R7 (1 chip later in propagation time and distance than ending chip 126). Node N7,1 correlation output is −1 during the time node N6,1 is correlated and will correlate in the same manner as did node N6,1 as received DSSS sequence 106 propagates past node N7,1 as illustrated by the dashed line. Again, peak correlation occurs at value point 124 when received DSSS sequence 105 lines up with local DSSS sequence 125.

Input message data is formatted into fixed length transmitted message packets which are simply referred to herein as messages except when describing the actual transmitted message packet format.

A key element of the present invention is to use node location and propagation time to prevent message collisions between nodes during a time slot. All nodes will be timed by GPS to start their time slot and cross correlation. However, only nodes whose PN code sequence aligns with an identical propagating PN code sequence at that time will be correlated and decoded. In the example above, messages destined for node N6,1 will be transmitted by access point 35 by initializing the PN code sequence to start one code chip earlier than will messages destined for node N7,1. The PN code sequence for messages destined for node N7,1 will be initialized 1 code chip later than will messages destined for node N6,1 as illustrated in FIG. 4.

Figure 4:
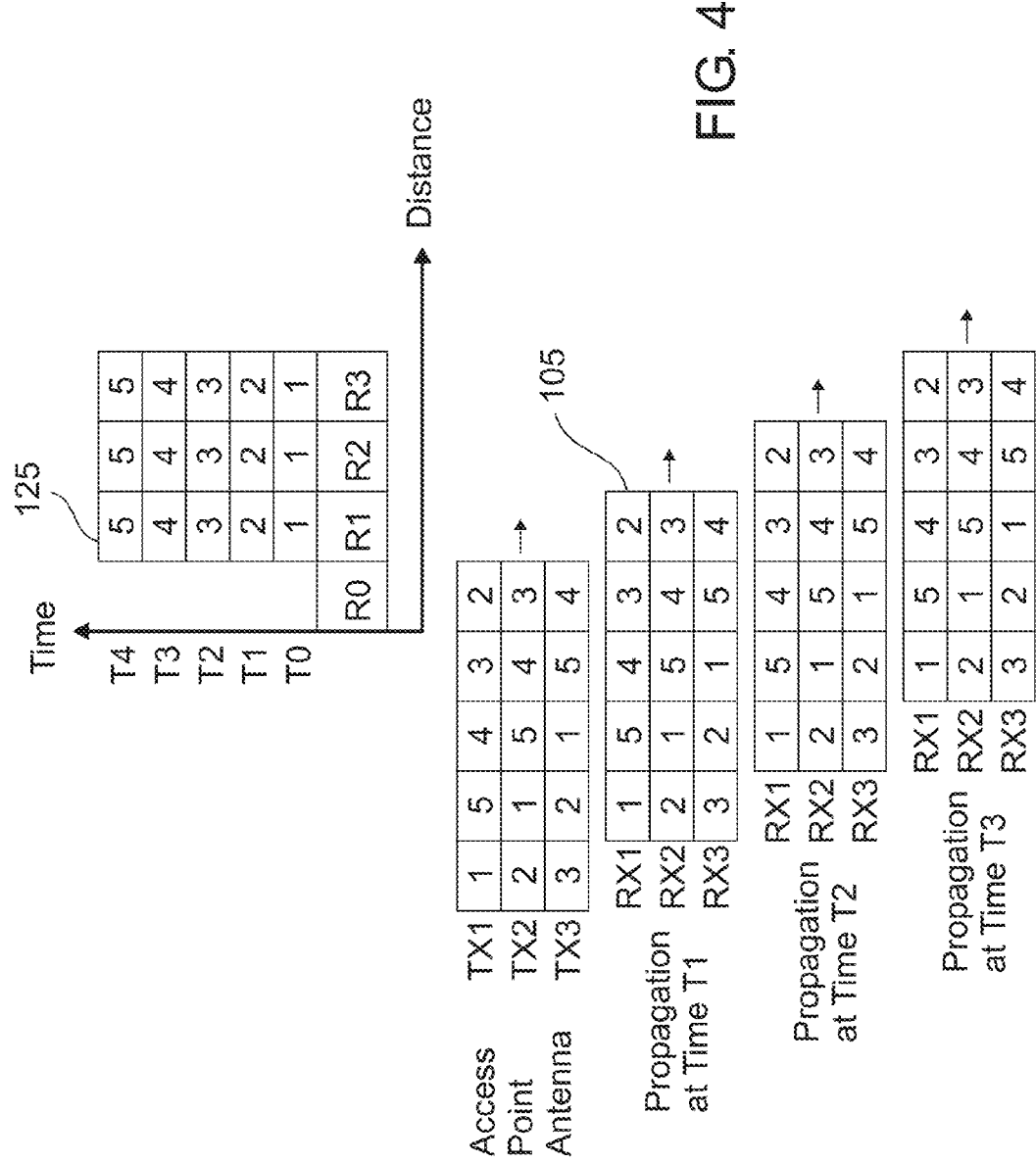
FIG. 4 shows access point DSSS signal propagation with respect to nodes in the first 3 range rings at various propagation times.

In FIG. 4, assume the DSSS code sequence length is 5 chips and the service area contains 3 range rings. R0 represents access point 35 antenna position and R1 through R3 represents range rings Ri. TX1 represents the transmitted DSSS sequence chip numbers for messages destined for a node N1,j in range ring R1. TX1 sequence is initialized to DSSS chip 2 so the transmitted sequence is 2, 3, 4, 5, 1 to spread the first data symbol. This PN code spreading sequence is then repeated for each subsequent data symbol destined for a node N1,j in range ring R1.

TX2 represents the transmitted DSSS sequence chip numbers destined for a node N2,j in range ring R2. TX2 sequence is initialized (one chip later than was TX1) to DSSS chip 3 so the transmitted sequence is 3, 4, 5, 1, 2 which is again repeated for each subsequent data symbol destined for a node N2,j in range ring R2. Likewise for TX3 destined for a node N3,j in range ring R3. TX1, TX2, and TX3 are all transmitted in parallel starting at the same time. FIG. 4 represents these transmitted sequences as wireless signals in space as they propagate from left to right in FIG. 4.

At the same time T0 that access point 35 begins transmission of the DSSS sequences, nodes 25 for which the transmission are destined also start their correlations. The local DSSS sequence 125 is identical for all nodes 25 and the chip sequence is 1, 2, 3, 4, 5 as illustrated above range rings R1, R2, and R3 in FIG. 4.

Propagation times T1, T2, and T3 are 1, 2, and 3 chip times respectively after T0 and RX1, RX2, and RX3 represents the propagating access point 35 transmitted signals TX1, TX2, and TX3 respectively. At T1 these propagating signals reach the center of range ring R1 where they represent received DSSS sequences 105. Note that at T1, chip 2 of RX1 (received DSSS sequence 105) is aligned with chip 2 of local DSSS sequence 125. Likewise chip sequences 3 and 4 are both aligned at propagation times T2 and T3 respectively for RX1 and range ring R1. Therefore, RX1 correlates with a node N1,j in range ring R1 and thus access point 35 messages designated for range ring R1 are received. Also note that propagating signals RX2 and RX3 are not correlated with a node N1,j in range ring R1 and are thus not received. In fact, the correlation of a node N1,j in range ring R1 with RX2 equals −1 as does the correlation with RX3 over the length of the sequence. The reason for transmitting TX1, TX2, and TX3 simultaneously is to obtain this minimum m-sequence correlation value of −1. Correlations over partial m-sequences are not necessarily equal to −1. RX2 correlates in range ring R2 and RX3 correlates in range ring R3 and thus RX2 and RX3 messages are received in range rings R2 and R3 respectively.

Figure 5:
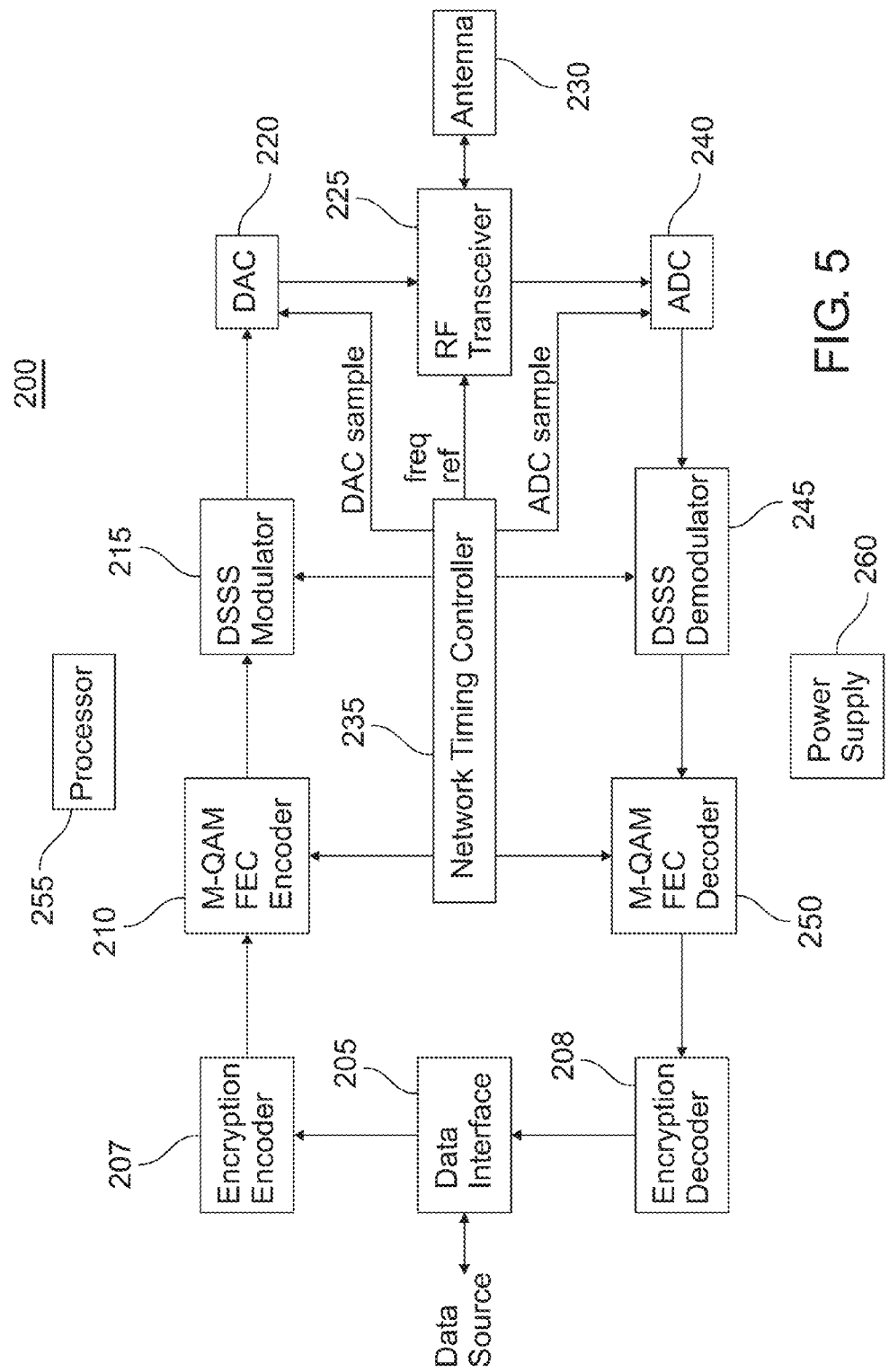
FIG. 5 shows a block diagram of one embodiment of a node configured in accordance with the teaching of the present invention.

Node 25 block diagram 200 is illustrated in FIG. 5. Data interface 205 sends/receives data to/from data source 15 in FIG. 1. Data interface 205 can implement hard wired or wireless connections such as Bluetooth, Wi-Fi, ZigBee, or others as needed to interface with data source 15.

Data received by data interface 205 can be encrypted if desired using encryption encoder 207 and then Forward Error Correaction (FEC) encoded using M-QAM convolutional encoder 210. Encoded symbols are then spread with a PN code sequence in DSSS modulator 215, converted in Digital to Analog Converter (DAC) 220 and sent to Radio Frequency (RF) transceiver 225 to be transmitted by node antenna 230 to access point 35.

Wireless signals from access point 35 arriving at node antenna 230 are received by RF transceiver 225, digitized in Analog to Digital Converter (ADC) 240, despread in DSSS demodulator 245, FEC decoded in M-QAM convolutional decoder 250, decrypted if required in encryption decoder 208, and sent to data interface 205 where the data is transferred to data source 15. Network timing controller 235 provides time and frequency synchronization, processor 255 controls the overall operation of node 25, and power supply 260 supplies node 25 power.

Node antenna 230 is ideally directional and pointing towards access point 35. A directional antenna has increased gain and also reduces interference from other wireless systems. Since access point 35 is situated at an elevated position, most fixed nodes can take advantage of directional line-of-sight communication with this star topology central access point.

Figure 6:
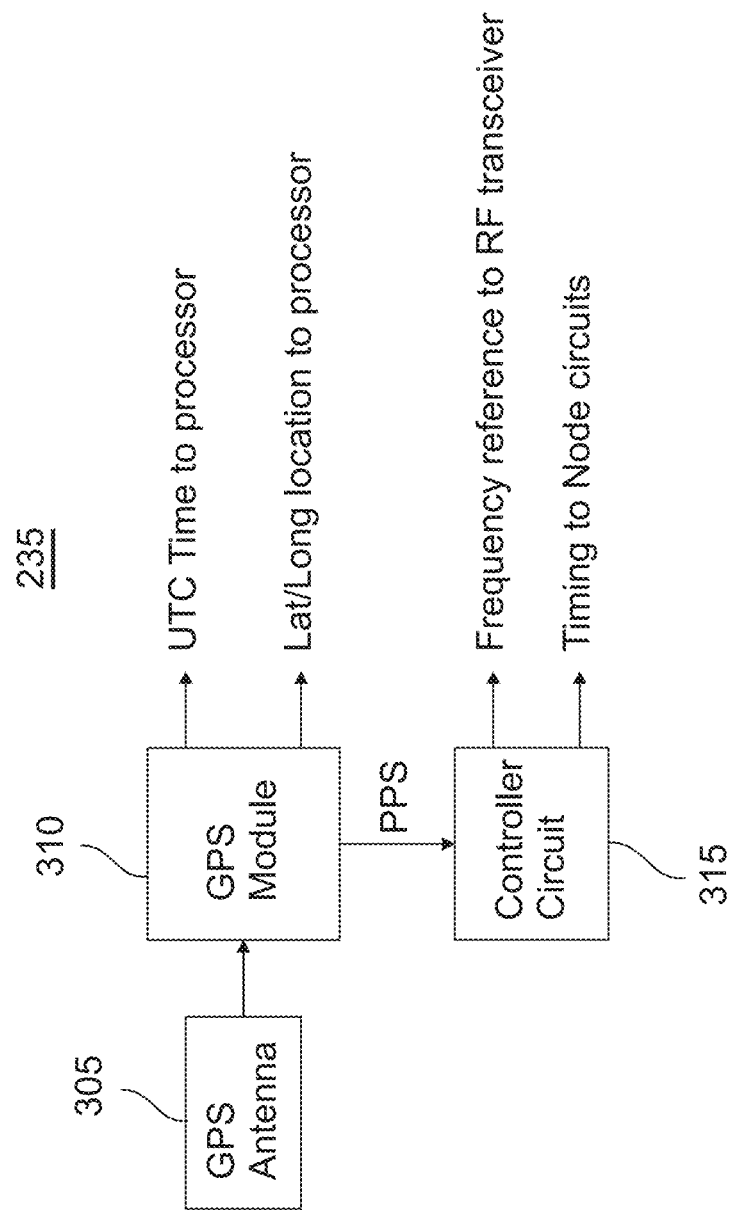
FIG. 6 shows a block diagram of the network timing controller using GPS.

A key element of the present invention is network synchronization using GPS or other means. A functional block diagram of network timing controller 235 and its outputs is illustrated in FIG. 6 when GPS synchronization is used. Network timing controller 235 is composed of GPS antenna 305, GPS module 310, and controller circuit 315. GPS antenna 305 receives GPS satellite signals for GPS module 310 which provides time, location, and a one Pulse Per Second (PPS) timing signal that can be used to define the periodic time slot period.

Modern GPS circuits are small, high precision, low cost, low current devices with fast acquisition times. PPS timing error is on the order of 50 nanoseconds and short term frequency stabilities on the order of $1^{-10}$ per 1 second can be achieved. Since GPS module 310 is locked to the GPS satellite system, which in turn is locked to atomic clocks, there is no long term timing drift. GPS module 310 provides processor 255 with UTC or GPS time and lat/long position coordinates and provides controller circuit 315 with the PPS timing signal.

Controller circuit 315 creates a precision frequency reference for transceiver 225 to ensure that the receive and transmit frequency of node 25 is precisely tuned to the corresponding frequency of access point 35. Since access point 35 and node 25 are stationary, no compensation for Doppler frequency shift is required. Controller circuit 315 also provides precise modulator and demodulator clock signals to DSSS modulator 215 and DSSS demodulator 245 respectively. These clock signals are adjusted so that node 25 appears to be located exactly at the center of its range ring.

When controller circuit 315 receives a PPS timing pulse, it delays the output of the clock signal to DSSS modulator 215 by a constant value equal to the sum of a constant delay, circuit delay, and range ring center delay. The constant delay ensures that the sum of all delays are positive. Circuit delay accounts for propagation delay through DSSS modulator 215 and transceiver 225. Range ring delay is equal to the propagation delay between the center of range ring Ri and node Ni,j location with respect to this center. Range ring delay can be positive or negative depending on if node Ni,j is further or closer to access point 35 than range ring Ri center.

In a like manner, controller circuit 315 clock signal to DSSS demodulator 245 will be delayed after a PPS timing pulse so that node Ni,j appears to be at range ring Ri center irrespective of its actual location in the range ring. When adjusted, all node 25 transmissions and receptions will appear to have originated or received exactly at the center of a range ring 55.

Since node 25 and access point 35 are stationary and their GPS locations precisely known, the propagation time between access point 35 and node 25 is known which can be used to precisely time or adjust the modulator and demodulator clock delays in controller circuit 315. Access point 35 will then initiate transmission to all nodes 25 at a GPS PPS time slot, using a DSSS chip sequence initialization related to the node 25 range ring number Ri for which the transmission is designated as was illustrated in FIG. 4. Each node 25 will then be in perfect timing alignment to decode the DSSS message transmitted to it by access point 35.

Figure 7:
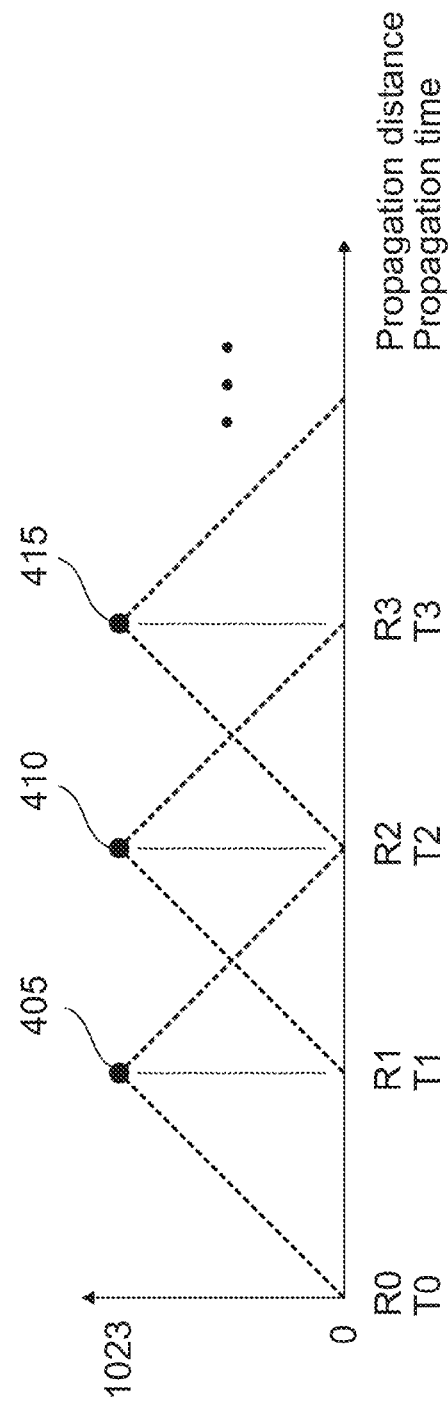
FIG. 7 shows access point correlator outputs for messages from nodes in various range rings.

Access point 35 messages received from node 25 transmissions are illustrated in FIG. 7. As was the case in FIG. 3*b*, access point 35 DSSS demodulation is performed at propagation times corresponding to range ring 55 centers. The dashed lines in FIG. 7 illustrate the correlation output obtained if the node 25 PN code sequence is not exactly equal to the propagation time of range ring 55 centers. However, node 25 GPS timing controller 235 ensures that all node 25 transmissions arrive at access point 35 as though each node 25 was precisely at range ring 55 center.

After a PPS timing pulse, any transmissions from nodes N1,j in range ring R1 are decoded at propagation time T1 405 in FIG. 7. Any transmissions from nodes N2,j in range ring R2 are decoded at propagation time T2 410. Likewise for nodes N3,j in range ring R3 at propagation time 415. Thus, even though all nodes in the coverage area transmit at the same time, their received transmissions at the access point are staggered in time by 1 chip period per range ring due to signal propagation delay. That is, access point 35 received message PN code sequence begins at the time slot plus a 1 chip delay for each range ring node 25 is distant from access point 35.

In FIG. 4, the access point transmitted PN code sequence was initialized 1 chip later for each range ring the node was distant from the access point so that the leading edge of the propagating transmitted access point message PN sequence was aligned with the node stored local PN sequence when the access point message arrived at the node.

For node to access point messages, the access point PN stored local code sequence is initialized 1 chip earlier for each range ring the transmitting node is distant from the access point so the leading edge of the propagating transmitted node message PN sequence is aligned with the access point stored local PN sequence when the node message arrives at the access point.

In FIG. 4, the access point transmit message PN code sequence for a node in range ring R1 was 2, 3, 4, 5, 1. The access point R1 demodulator stored local PN code sequence for a R1 node received message is 5, 1, 2, 3, 2 so the propagating R1 node leading edge chip 1 aligns with access point stored local chip 1 when it arrives at time T1 after one range ring propagation delay.

In these examples, the node modulation and demodulation PN sequence was initialized to chip 1 and the access point modulation and demodulation PN sequence was adjusted to account for the access point to node signal propagation delay. However, this adjustment could also be made at the node instead of at the access point for either modulation, demodulation, or both.

As long as no more than one node Ni,j located in the same range ring Ri transmits the same PN code sequence at the same GPS PPS time on the same frequency, there can be no collisions between node 25 transmissions. Likewise, as long as access point 35 does not transmit the same PN code sequence with the same initialization to more than one node Ni,j in the same range ring Ri at the same GPS PPS time slot on the same frequency, there will be no node 25 reception collisions.

Figure 8:
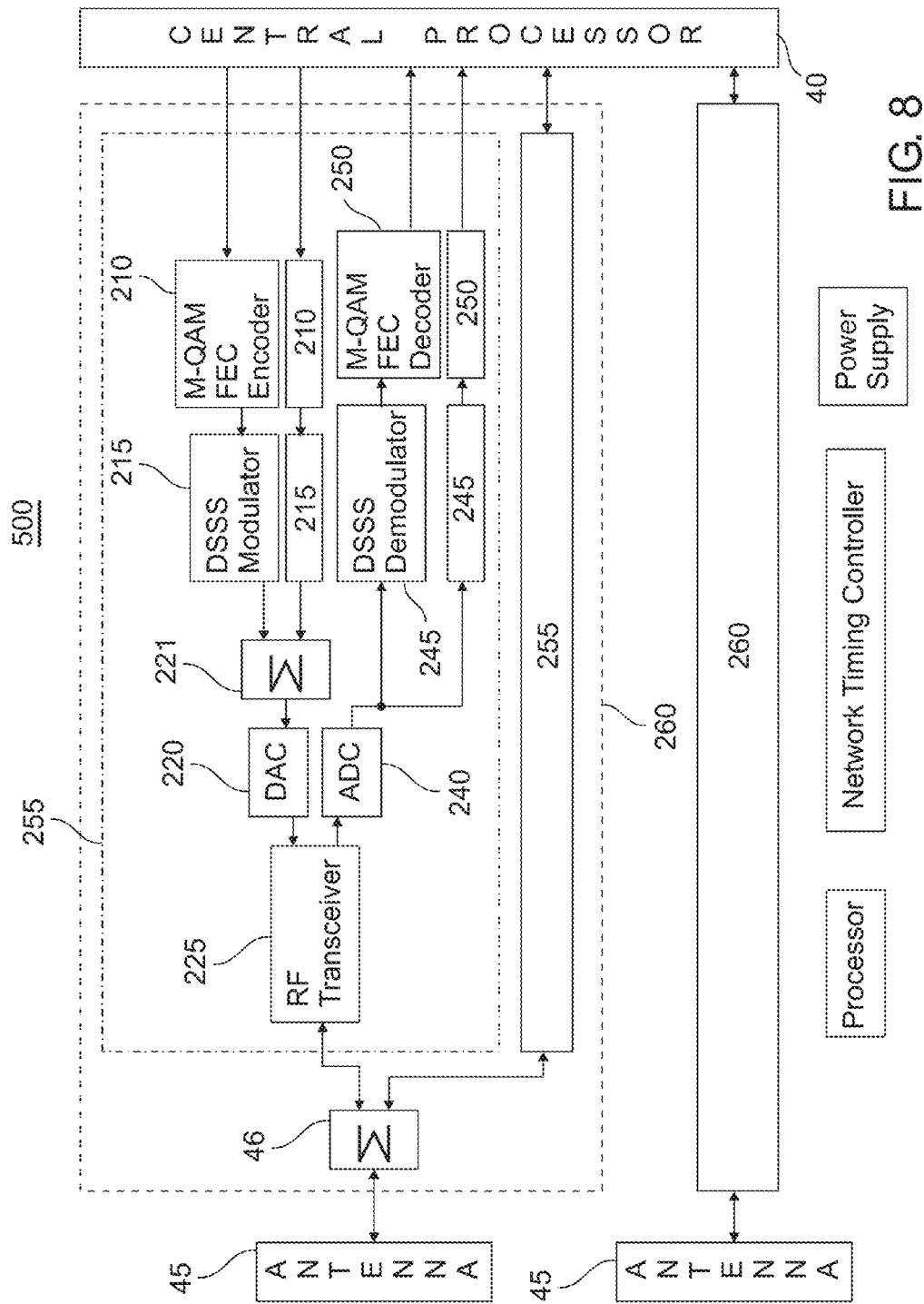
FIG. 8 shows a block diagram of one embodiment of an access point configured in accordance with the teaching of the present invention.

A general functional block diagram 500 of access point 35 is illustrated in FIG. 8 where the optional simultaneous use of multiple antennas, frequencies, and PN code sequences are illustrated. Many of the blocks are labeled the same as node block diagram 200 in FIG. 5 since they perform the same function in access point 35 as in node 25. However, access point 35 functional blocks need not necessarily use the same implementation as used in node 25. In access point 35, many digital functional blocks may simply refer to processing functions that are either parallel or serially processed using a single powerful high speed processing unit.

If multiple simultaneous frequencies are used, antenna 45 is connected through RF combiner/splitter 46 to multiple transceivers 225 which are tuned to different frequencies and perhaps implement different bandwidths. Each transceiver 225 output is analog to digital converted using ADC 240 and, if multiple different PN codes are used simultaneous, sent to multiple DSSS demodulators 245, one for each different PN code sequence. The output of each DSSS demodulator 245 is sent to M-QAM convolutional decoder 250 where messages are decoded and sent to central processor 40. Encryption decoder (208 in FIG. 5) if required is implemented in central processor 40.

Messages originating in central processor 40 are encrypted if required using encryption encoder (207 in FIG. 5) implemented in central processor 40, FEC convolutional encoded in M-QAM encoder 210, and PN spread in multiple DSSS modulators 215 (one for each different PN code sequence used). The output of all DSSS modulators 215 are summed in summer 221, digital to analog converted in DAC 220, and sent to transceiver 225.

Access point 35 block diagram 500 is completely general in that access point 35 may implement multiple antennas 45, support multiple transmit/receive frequencies, and perhaps use different bandwidths. For example, four non-overlapping 90 degree beamwidth antennas may be used to obtain complete 360 degree service area coverage. Multiple narrow beamwidth antennas provide higher gain than a single omnidirectional antenna and also reduce interference from other sources in shared usage frequency bands such as the ISM bands. Spot beam parabolic antennas may also be used in some cases to service special metropolitan areas that have a high density of nodes or require high data rates, especially if these areas are very distant from access point 35.

A powerful FPGA or processor could potentially implement a large number of DSSS modulators 215, DSSS demodulators 245, M-QAM encoders 210, and M-QAM decoders 250 blocks. These blocks could be switched as needed among any transceivers 225 to better utilize digital resources. That is, these digital blocks need not be hard wired or permanently allocated to any particular transceiver so as the network configuration changes over time and nodes are added or removed, digital resources can be dynamically reallocated.

M-QAM refers to M-ary Quadrature Amplitude Modulation where m equal 2 is Binary Phase Shift Keying (BPSK), m equal 4 is Quadrature Phase Shift Keying (QPSK), m equal 16 is 16-QAM, and m equal 64 is 64-QAM. Although any of these modulations could be used for M-QAM convolutional encoder 210 and M-QAM convolutional decoder 250, the most attractive choices are 16-QAM and 64-QAM since GPS synchronization easily allows coherent demodulation to be implemented. The pseudo-orthogonal QPSK signal encoders and decoders described in "Communication Method and Apparatus", U.S. Pat. No. 8,098,773 are most attractive due to their superior error correcting abilities. U.S. Pat. No. 8,098,773 is incorporated herein by reference.

Figure 9B:
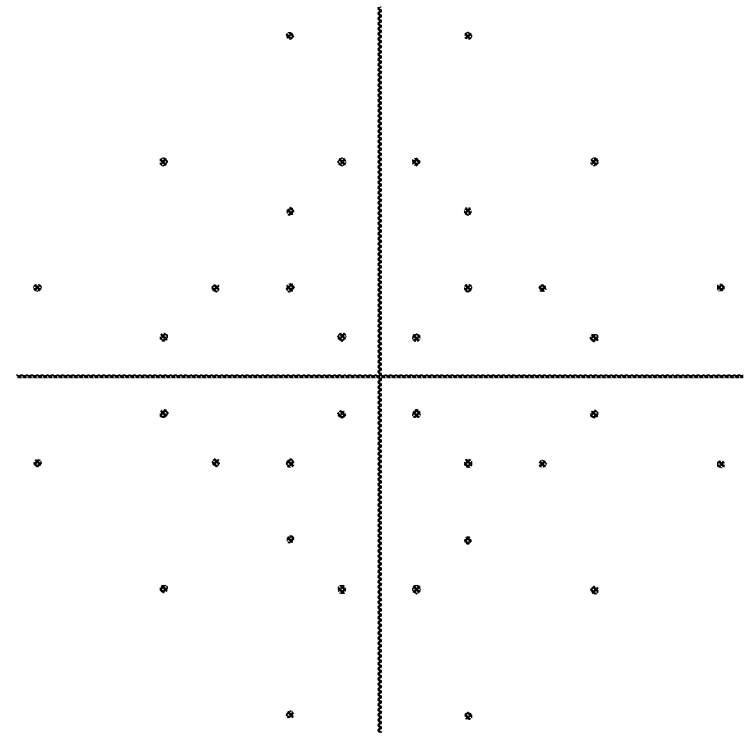
FIGS. 9A and 9B show versions of 16-QAM and 64-QAM phase point constellations respectively of M-QAM modulation.
Figure 9A:
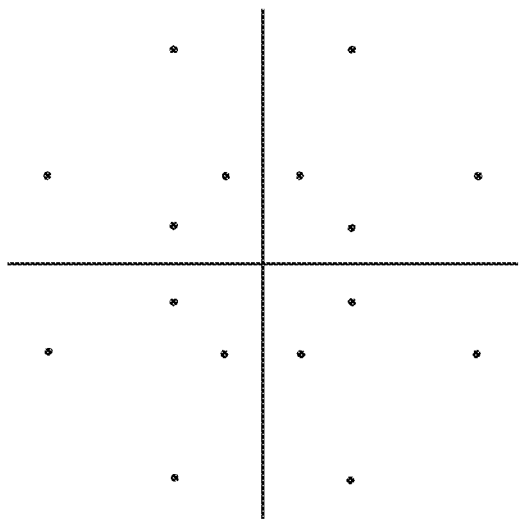

As described in U.S. Pat. No. 8,098,773, two bits of message data are rate ½ Viterbi encoded into 16-QAM symbols using the constellation illustrated in FIG. 9a. Symbols are decoded using an efficient sequential decoding algorithm in which all paths through the decoding trellis are retained until it is certain that a particular path cannot be the correct path. This rate ½ 16-QAM encoder/decoder provides 2 bits per symbol which gives 4 times the throughput of rate ½ BPSK, does not require additional bandwidth, requires less Signal to Noise Ratio (SNR) to achieve a given Bit Error Rate (BER), and has far superior error correction ability. The rate ½ Viterbi 64-QAM encoder/decoder described in U.S. Pat. No. 8,098,773 provides 3 bits per symbol which gives 6 times the throughput of rate BPSK. Its constellation, illustrated in FIG. 9b, contains 36 distinct phase point symbols but implements 64-QAM as explained in U.S. Pat. No. 8,098,773.

Figure 10:
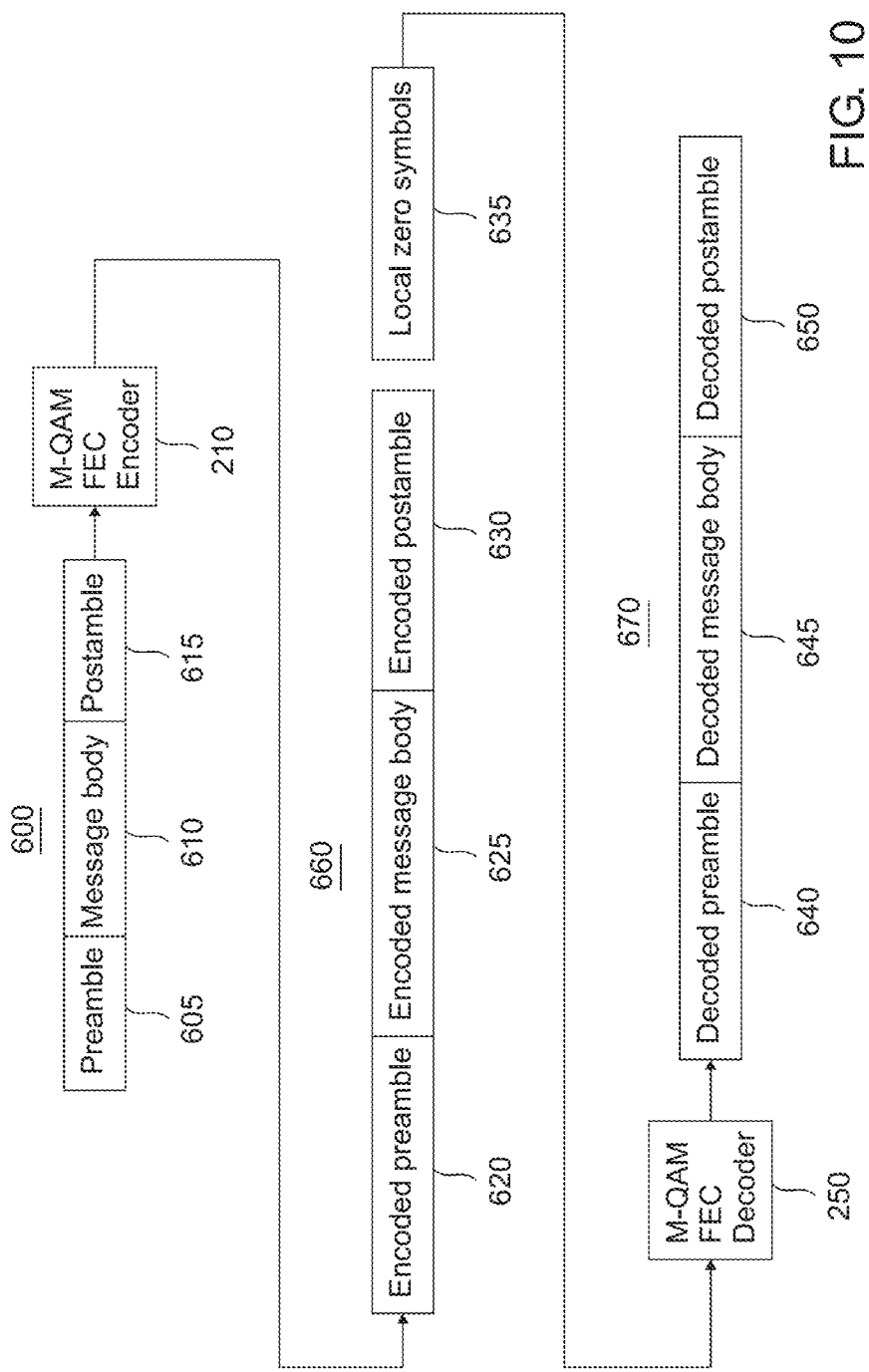
FIG. 10 shows message format prior to M-QAM FEC encoding, after encoding (transmitted message packet), prior to decoding, and after decoding.

The original, encoded, and decoded message formats for this wireless communication network are illustrated in FIG. 10. A selection of fixed length messages 600 will be defined composed of a fixed length message body 610, a short fixed length preamble 605, and a short fixed length postamble 615. Any short input data messages will be zero padded to fill message body 610.

The purpose of preamble 605 is to correct any received message phase rotation error with respect to the quadrature decoding reference coordinates. Although GPS synchronization essentially eliminates time and frequency errors between node 25 and access point 35, small circuit and positional uncertainties can rotate message phase. By transmitting a short preamble at a known phase, the receiver can make any required phase corrections.

The purpose of using fixed message length 600 and postamble 615 is to end encoded message 660 in the encoder zero state. Postamble 615 contains a number of "zero" encoder input bits, the number related to the constraint length of the Viterbi encoder, which returns M-QAM convolutional encoder 210 to its zero state. Encoded message 660 is the actual transmitted message packet and consists of encoded preamble 620, encoded message body 625, and encoded postamble 630. The final symbols in encoded postamble 630 encoder output, are output symbols resulting from encoder postamble 615 input "zero" bits, obtained as the Viterbi encoder returns to its zero state.

The convolutional decoder described in U.S. Pat. No. 8,098,773 retains all paths through the decoding trellis until it is certain a path is not the correct path. At the end of the message, in a noisy communication environment, the minimum metric path may not be the correct path.

When transmitted encoded message 660 (transmitted message packet) is received, a number of noiseless locally generated "zero symbols" 635 are added to received encoded message 660 prior to decoding. Since added "zero" symbols 635 are noiseless, they quickly eliminate all incorrect paths thus identifying the correct path and thus the correct decoded message 670. The decoded preamble 640 and decoded postamble 650 of decoded message 670 will be discarded and the original transmitted message in decoded message body 645 will be sent to central processor 40 for access point messages and to processor 255 for node messages.

A key advantage of using fixed message lengths and GPS synchronization is that messages can be ADC captured when they are expected, stored in Random Access Memory (RAM), and processed in non-real-time. This allows a much simpler processor to be used to decode messages than if messages had to be processed in real-time. Another advantage of the convolutional decoder described in U.S. Pat. No. 8,098,773 is that parallel or serial processing can be used to calculate residuals on a path-to-path basis. For non-time-critical messages, very high order M-QAM decoders can be implemented using simple processors which increases the bits per symbol and allows more information to be transmitted per message without having to increase the data rate, bandwidth, or processor size. Message lengths can be associated with PN code sequences so that transmitting or receiving on a particular PN code automatically defines its message length.

A node receive only (RX control) channel and a node transmit only (TX control) channel, each using a unique PN code sequence, will be defined for nodes 25 to listen for control messages from access point 35 or to send control messages to access point 35. Since access point 35 knows when to expect scheduled messages, it will use the RX control channel to request resend of a missed or in error message or to request an additional message. For example, access point 35 might request an unscheduled voltage reading from the node.

The resend message will indicate the time and PN code to use for the resend. Each time a node sends a message, it will monitor this RX control channel at multiple specified times after transmitting the message for a resend request.

The TX control channel will be used by a node 25 to request sending an unscheduled message to access point 35. For example, a node might request sending an alarm message to report a power outage.

A key feature and benefit of the present invention is its configurability and scalability. Multiple node 25 message protocols can be implemented for multiple different types or sets of nodes depending on the node's function. Some nodes can even be assigned their own unique PN code sequence and frequency so they can communicate nearly continuously. Others, like meter reading nodes, may only need to communicate a single message once a week or month.

Access point to node reconfiguration messages can be implemented to select different node configuration parameters such as DSSS PN code sequences, time slots, RF transceiver frequency, message formats, etc. This capability allows the network to be upgraded or expanded in the future if required.

Figure 11:
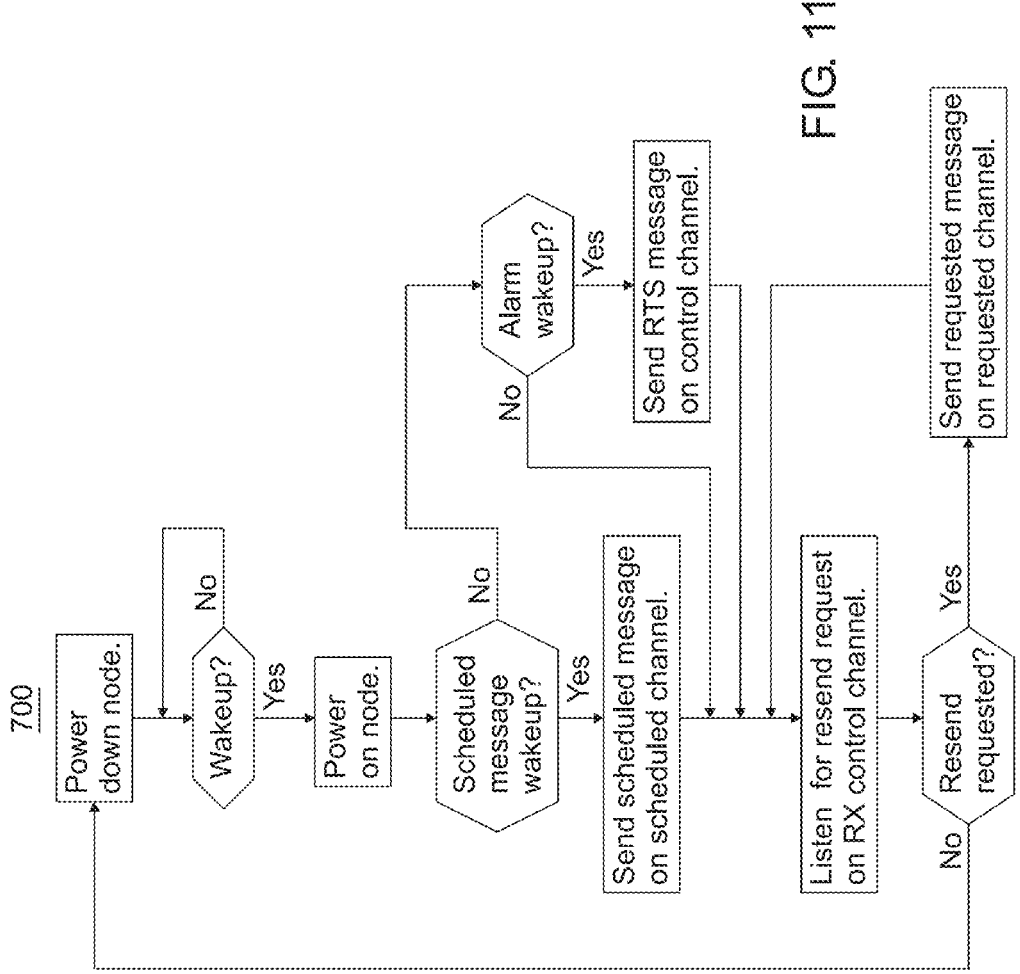
FIG. 11 shows a node message flowchart for an example node operation embodiment.

For meter reading and similar applications, it is assumed that nodes 25 operate on long life battery power and only wakeup on a scheduled basis to report weekly or monthly power usage. Scheduled wakeups and alarm wakeups can be easily implemented using a very low power microcontroller. For example, node message flowchart 700 illustrated in FIG. 11 assumes the primary function of node 25 is to send meter data to access point 35 at a scheduled time but also allows node 25 to request sending a message to access point 35 at any time or to listen to access point 35 at a scheduled time for a requested message.

Upon waking up, node 25 is powered on to acquire network timing. If this is a scheduled message wakeup, the scheduled message is transmitted to access point 35. Node 25 then switches to receive mode using the RX control PN code and listens on the next few GPS PPS time slots for a resend request. More than one GPS PPS time slot is monitored in case the RX control message is jammed by interference. The RX control message will contain message requests for multiple Ni,j nodes in range ring Ri if required. If node Ni,j does not receive a resend request, node 25 powers down.

If access point 35 did not receive the message, the message was in error, or a new message was requested, then the RX control message for node Ni,j will indicate the PN code sequence and GPS PPS time slot on which to send the requested message.

If the wakeup was not to send a scheduled message and was not an alarm wakeup, then the wakeup was to monitor the RX control channel for a message request from access point 35. This wakeup allows access point 35 to communicate with a node more frequently if a node 25 scheduled message wakeup is only once a week or month. Access point 35 knows when these monitoring wakeups occur and can use them to request information from the node. For these wakeups, node Ni,j switches to receive mode on the RX control channel for the next few GPS PPS time slots to determine if access point 35 is requesting information from node Ni,j.

A transmit only Request to Send (RTS) channel using one or more unique RTS PN code sequences will be defined that all nodes can use to transmit their RTS message. To prevent collisions from multiple nodes Ni,j on range ring Ri, the RTS channel message will consist of the transmission of a single RTS PN code sequence which will be repeated at a few GPS PPS time slots in case access point 35 is jammed by interference during node transmission. Each node Ni,j in range rings Ri will be assigned a RTS sequence transmission starting time equal to i−1 times a number greater than the number of range rings in the service area. The arrival time of the RTS sequence at access point 35 defines the node Ni,j requesting to send a message.

As an example of the technique, assume access point 35 service area contains 200 range rings. Assume the RTS PN code sequence chip width is equal to the range ring width, contains 1,024 chips, and is transmitted at a 1 MHz chip rate. Nodes Ni,1 transmits the RTS code at time GPS PPS for all range rings Ri. Nodes Ni,2 transmits at time GPS PPS plus 1024 chip periods for all range rings Ri. Nodes Ni,3 transmits at time GPS PPS plus 2 times 1024 chip periods for all range rings and so on for all nodes Ni,j. Using a single parallel DSSS demodulator at access point 35, the correlator output is illustrated in FIG. 12a assuming all nodes transmitted a RTS message.

Starting at GPS PPS time slot, the DSSS correlator output for nodes Ni,1 (i=1 to 200) is identical to FIG. 3b and FIG. 7. That is, the first node in each range ring transmits the RTS code at GPS PPS time slot and arrives at access point 35 at a time equal to the node's range propagation time. Nodes Ni,2 transmissions are delayed by a time equal to the length of the RTS PN code sequence so their transmissions arrive at access point 35 DSSS demodulator 1024 starting 1024 chip periods after the GPS PPS time slot. This process repeats for all nodes Ni,j. In reality, very few nodes will transmit a RTS message during each GPS PPS time slot period of 1 second. The nodes that do are identified by the time delay from GPS PPS of their correlation output.

Figure 12A:
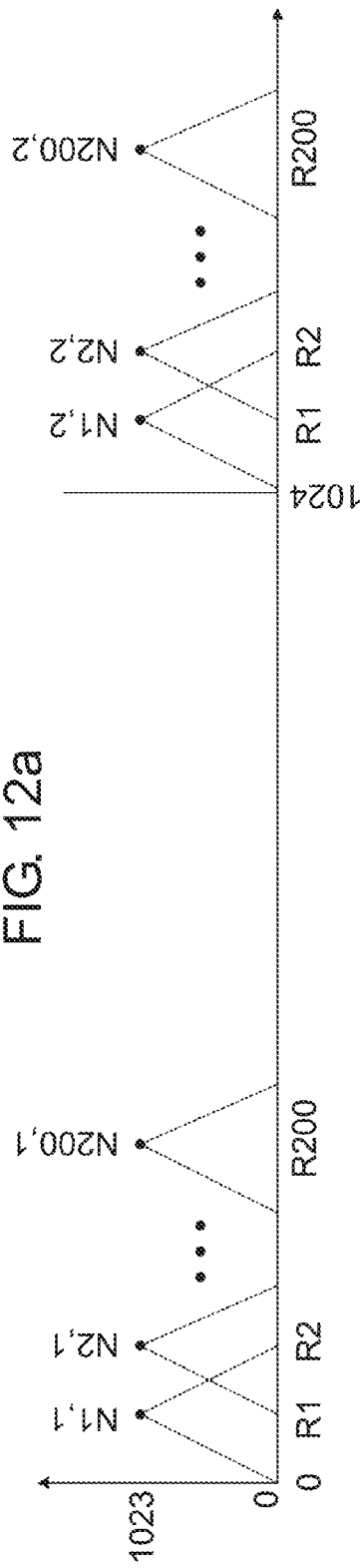
FIGS. 12A and 12B show access point correlator outputs for node Request-to-Send (RTS) messages.
Figure 12B:
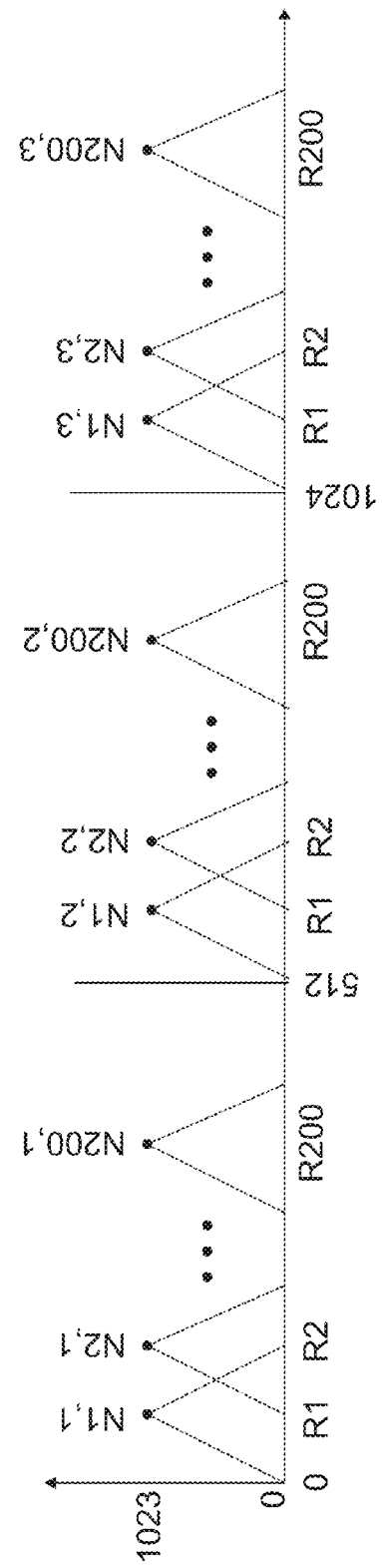

For the example illustrated in FIG. 12a, there are 976 code sequence periods of 1,024 chip code sequences transmitted at a 1 MHz chip rate in a one second PPS period. To service more nodes, each group of 200 nodes can be delayed by 512 chip periods (half the PN sequence width instead of the whole sequence width) and two parallel DSSS RTS sequence demodulators can be implemented in access point 35. The first demodulator starts at GPS PPS and the second demodulator is started at time GPS PPS plus 512 chip periods. The result is illustrated in FIG. 12b in which a second collection of nodes fills in the time gap between nodes N200,1 and N1,2 and so on. The example in FIG. 12b will now service twice as many nodes per range ring as the example in FIG. 12a.

The example in FIG. 12b also illustrates the technique for increasing detection range without reducing the number of nodes that can be serviced. If the RTS PN code sequence length is doubled to 2048 chips, only half as many nodes can be serviced in FIG. 12a but the same number of nodes can be serviced in FIG. 12b. Any number of nodes can be serviced at any required detection range simply by adding additional parallel RTS DSSS decoders or by defining additional RTS PN code sequences and adding RTS DSSS decoders for them in access point 35.

Figure 13:
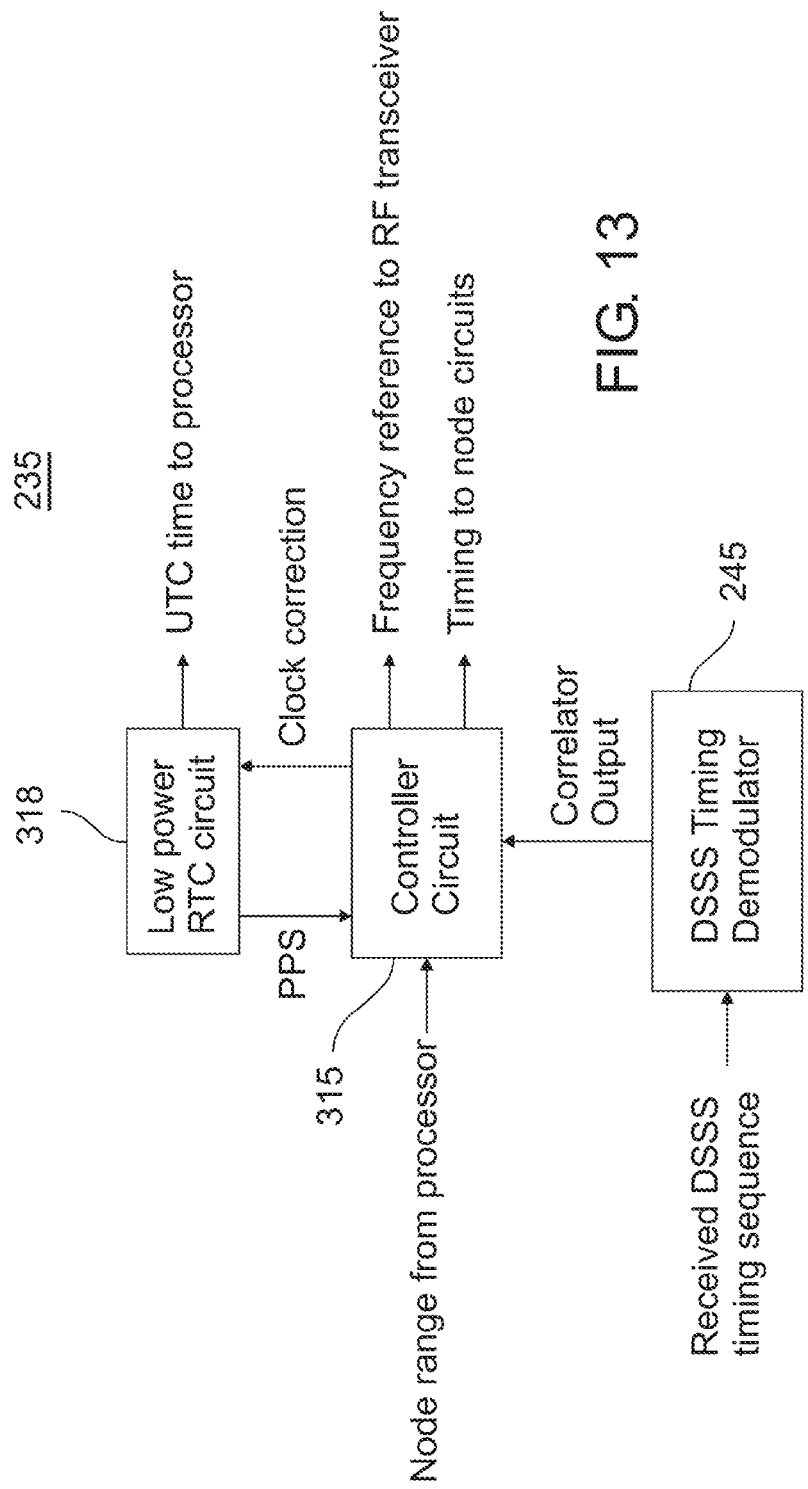
FIG. 13 shows a block diagram of the network timing controller using an access point DSSS timing sequence.

A functional block diagram of network timing controller 235 and its outputs was illustrated in FIG. 6 when GPS synchronization is used. Although GPS synchronization is preferred, other methods of achieving network synchronization can be used. Network synchronization using a DSSS timing PN sequence is illustrated in FIG. 13. When a node 25 is installed, its GPS location is measured and its range from access point antenna 45 is stored in non-volatile memory such as flash memory. Access point 35 transmits a continuous DSSS timing PN code sequence using a unique code on its own unique frequency. This PN code can be locked to GPS or some other stable clock source at access point 35. Using the measured node to access point range, nodes 25 can demodulate this DSSS timing sequence to obtain network synchronization. This method is equivalent to using a single GPS satellite for timing synchronization at a fixed location.

In FIG. 13, low power Real Time Clock (RTC) circuit 318 operates continuously to provide time and date to within a few parts-per-million. When node 25 is powered up, DSSS timing demodulator 245 receives DSSS timing sequence from access point 35. DSSS timing demodulator 245 correlator output, RTC circuit 318 PPS time slot output, and the node's range from access point 35 is used by controller circuit 315 to synchronize and provide clock corrections to RTC circuit 318.

Encryption encoder 207 and encryption decoder 208 in FIG. 5 can be implemented using any of the industry standard encryption methods. However, a preferred encryption method is to use a modified implementation of One Time Pad (OTP) encryption due to its simplicity. In true OTP encryption, a random byte is added to each clear text byte to encrypt it prior to transmission. Upon reception, the same random byte is added to the received encrypted byte to obtain clear text again. Perfect security is guaranteed as long as the sender and receiver keep the list of random bytes secret and use the list only once.

Figure 14:
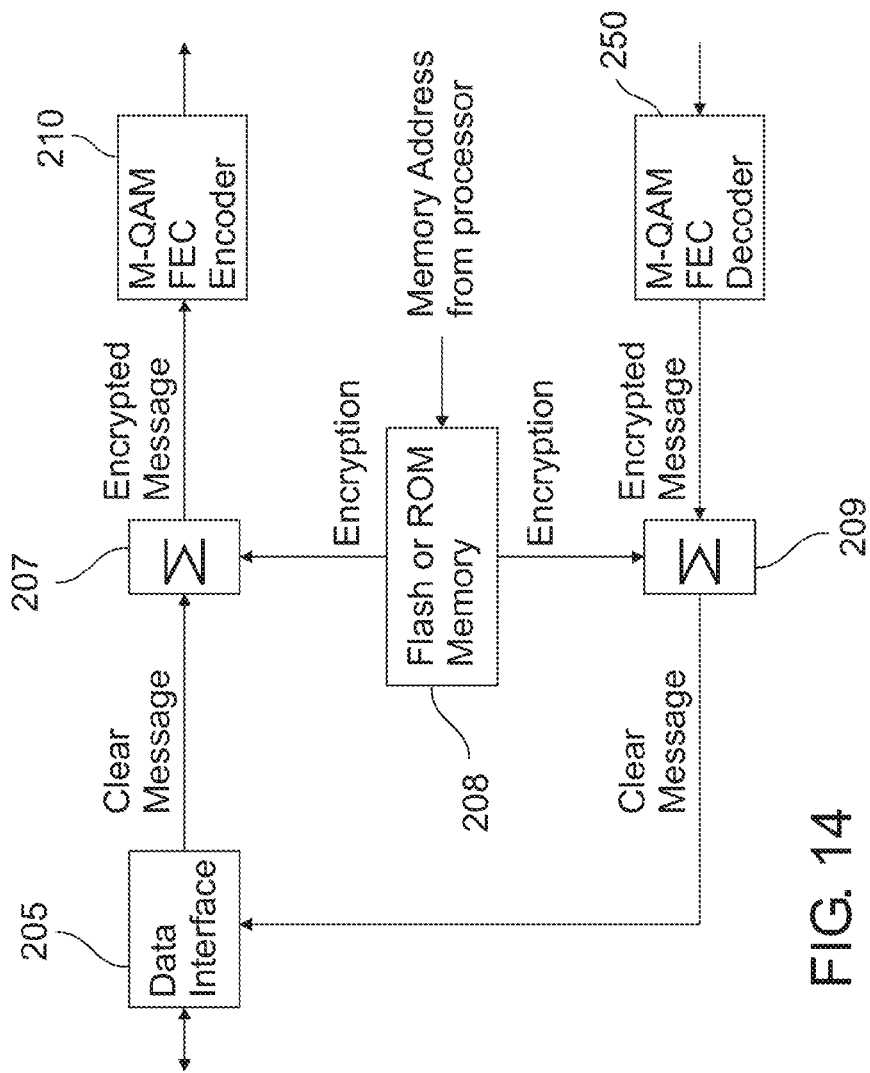
FIG. 14 shows a block diagram of an embodiment of the One-Time-Pad (OTP) encryption technique configured in accordance with the teaching of the present invention.

FIG. 14 illustrates an implementation of OTP encryption in the present invention. Clear messages from data interface 205 are simply modulo-2 summed (bit-for-bit) or modulo-256 summed (byte-for-byte) in adder 207 to produce encrypted messages for M-QAM FEC encoder 210. Likewise encrypted messages from M-QAM decoder 250 are modulo-2 or modulo-256 summed in adder 209 to produce clear messages for data interface 205. Encryption list bytes are stored in flash or Read Only Memory (ROM) 208 which are selected using a memory address generated by processor 255. Memory address can be generated sequentially for each message byte.

If perfect security is required, encryption bytes could be stored in flash and erased each time they are used but this would eventually exhaust the entire list of random bytes. Adequate security can be obtained in many applications, such as smart grid applications, if access point 35 sends a clear text memory offset address with each message. For example, if messages are 256 bytes, a one megabyte ROM holds the OTP encrypted bytes, and a message is sent once every 15 minutes, then the same clear text address would not have to be repeated for 30 years. It would require a hacker to intercept at least 2 encrypted messages in order to decode the clear text and encrypted bytes for just that memory offset address. If every node had its own unique OTP list, physical compromise of one node, where the intruder read the OTP ROM, would not compromise any other node.

A large variety of spreading code sequences are described in communication and CDMA publications. The goal of these sequences is to maximize their in-phase autocorrelation and minimize their out-of-phase correlation. M-sequences have the best possible periodic autocorrelation since their in-phase autocorrelation is equal to the length of the sequence and their out-of-phase autocorrelation is −1. That is, m-sequences have the very desirable property of a two-valued autocorrelation function. However, cross-correlations between different equal length m-sequences are poor since their cross-correlations are multi-valued with many high peaks.

In CDMA systems, each transmitter is assigned a distinct spreading code. Since many users are transmitting at the same time, cross-correlations between user codes cause interference which is minimized by selecting codes with high autocorrelation and low cross-correlation. Gold sequences are typically used for CDMA applications because their cross-correlations are low-er than m-sequences. However, the autocorrelation properties of Gold sequences are not as good as those of m-sequences.

A key benefit of the present invention is that m-sequences can be used because user interference is due to out-of-phase autocorrelation between users and m-sequence interference is the lowest possible. Also, since all access point transmissions to nodes propagate as a group, they all attenuate as a group. That is, for nodes 25 close to access point 35, the signal level of all transmitted sequences is high and for far nodes all signal levels are low. In a CDMA system, user transmitter power must be carefully managed so that signals for close users do not over power signals for far users. The present invention does not have this problem by design.

This is not the case for node transmissions back to access point 35 so node RF transmit power for nodes 25 close to access point 35 must be reduced with respect to node power for more distant nodes. Access point 35 will monitor received node power when the node is installed and use a RF power reconfiguration message to adjust the node's power. Since nodes 25 are at fixed locations, this adjustment should only have to be done on initial node setup.

The number of possible simultaneous users is higher for m-sequences than for any other spreading codes. Assume that the m-sequence length is 1024 chips. If 1024 users were simultaneously transmitting, then the SNR between users would be 0 dB since the in-phase autocorrelation value of 1024 would equal the out-of-phase autocorrelation value of −1 per user times 1024 users. If a SNR of 6 dB were required for reliable communication, then no more than 256 users could transmit simultaneously using a 1024 length m-sequence.

Although cross-correlations between equal length m-sequences can have high peaks, there are particular code offsets in which the cross-correlations are low. Since code offsets in the present invention are limited to the number of range rings 55, particular m-sequences or other sequences can be "cherry picked" for minimum cross-correlations over these limited offsets. This will allow a few different codes to be transmitted simultaneously without significantly degrading the SNR due to user interference. This technique is not possible in traditional CDMA systems where random offsets of any value between different codes occur.

Figure 15:
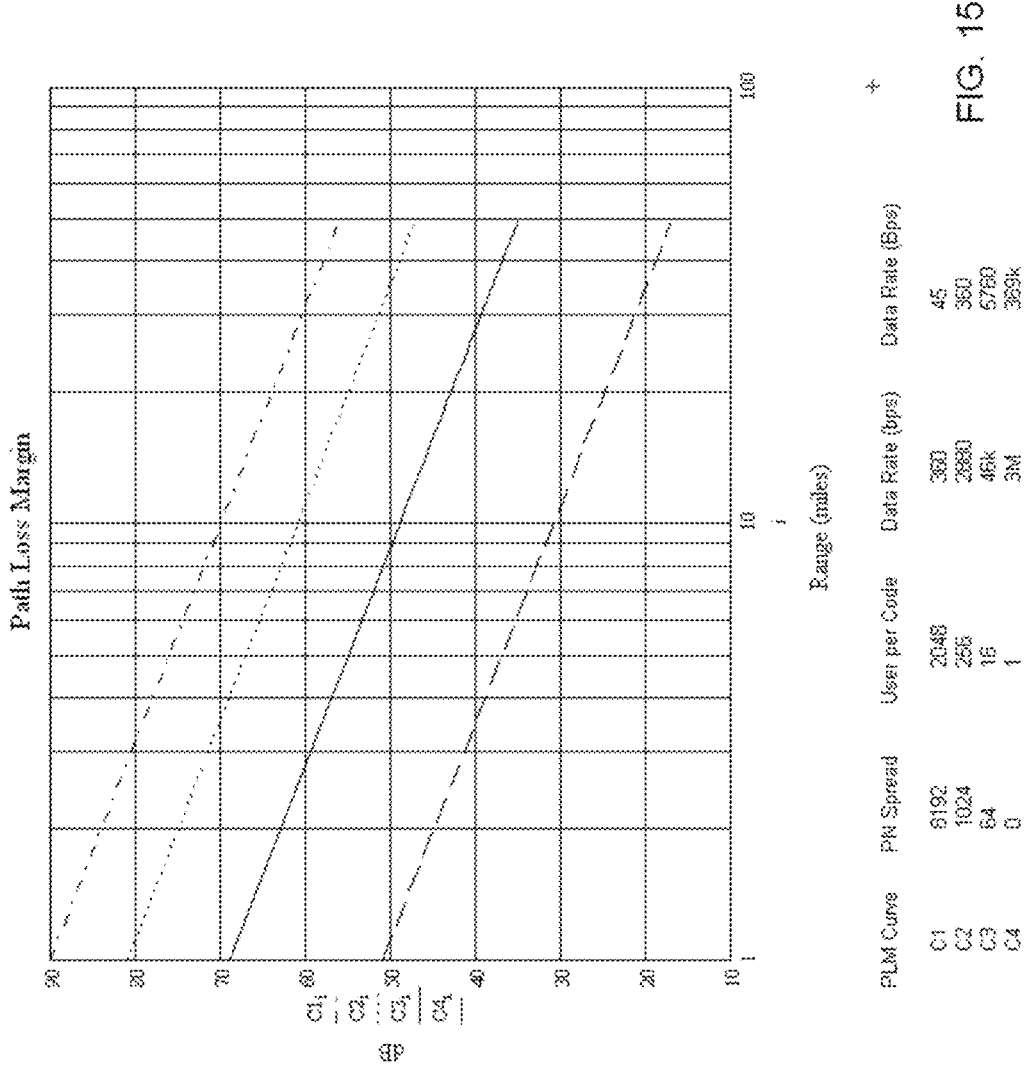
FIG. 15 shows a graph and table predicting communication performance of the present invention for various spreading code lengths.

FIG. 15 illustrates an example of performance possible using the present invention in the 2.4 GHz ISM band, using United States (US) Federal Communication Commission (FCC) power and antenna rules, 1 MHz chip rate, 1 second GPS PPS transmission or reception time slots, and 64-QAM modulation described in U.S. Pat. No. 8,098,773. Path Loss Margin (PLM) is sensitivity margin over free space loss at each range. This margin can be used to overcome actual path loss and interference present in the 2.4 GHZ ISM band. At a 1 MHz chip rate, a 50 mile service area contains 268 range rings.

PLM curve C1 uses a spreading code length of 8192 chips. This code will support 2048 users and still maintain a 6 dB SNR. The data rate per GPS PPS time slot is 350 bits per second which is 45 bytes per second. The code length of curves C2, C3, and C4 are 1024 chips, 64 chips, and 0 chips (no spreading) respectively.

There are 86,400 GPS PPS 1 second time slots per day which can be used for either node 25 transmissions, receptions, or control channel communications. Assuming this is a meter reading application, the service area contains 200 range rings, and 75,000 time slots are assigned for node 25 transmissions to report meter readings to access point 35. Then curve C2 of FIG. 15 illustrates that 15 million meters per day could each send more than a 256 byte message to access point 35. The other 11,400 periods could be used for other purposes such as sending high resolution surveillance pictures from substations or other physical assets.

A key benefit of the present invention is its configurability and scalability. The indicated capacity in FIG. 15 can be easily doubled simply by over-the-air reprogramming half the nodes to either use a different code or to tune to a different frequency. The same system can be used for many different communication applications including tracking. Assume a large number of nodes are used to collect utility Supervisory Control and Data Acquisition (SCADA) data at substations or other fixed assets. These nodes could be on continuously using local power or solar cells. Data interface 205 could be implemented to support Bluetooth or other short range communications from service trucks equipped to report their GPS location to data interface 205 when close to one of these nodes. Many other example applications can be envisioned.

It is important to realize that this invention does not simply combine commonly known CDMA, TDMA, FDMA, or other multiple access techniques to achieve its performance. CDMA uses a large number of different codes at random offsets to achieve multiple access. In contrast, this invention relies on signal propagation range for user multiple assess and only adds additional codes to increase these multiple access users per time slot by a factor of n where n is the number of additional codes.

U.S. Pat. No. 7,782,926 describes a node to access point technique called random phase multiple access. This technique is similar to CDMA except it uses random offsets of the same code instead of orthogonal codes. Offsets are random over the entire length of code and the technique suffers from the same collision, retransmission, acquisition, and synchronization problems as CDMA. In contrast, offsets of the present invention are a function of range, are not random, only occur over a limited portion of the code, and collisions do not occur.

Most TDMA techniques achieve multiple access using a very structured time slot allocation. In contrast, this invention time shares resources among users in an unstructured manner. A particular time slot can be allocated or reallocated to any node at any time for transmission, reception, or control channel use.

FDMA use a large number of frequencies to achieve multiple access. In contrast, this invention relies on signal propagation range for user multiple assess and only adds additional frequencies to increase these multiple access users per time slot by a factor of n where n is the number of additional frequencies.

For nodes requiring full time one-way communications, they can be provided their own frequency channel. If two-way full duplex communications is required, a unique frequency can be used for transmit and a second unique frequency used for receive. Examples might be for continuous two-way surveillance or control purposes. For either purpose, these nodes can be easily accommodated using this communication system invention.

Multiple antennas with non-overlapping directional beamwidths can also be used to increase multiple access by allowing more unique DSSS PN code sequences to be used per range ring. Using a narrow antenna beamwidth reduces a range ring circular arc so fewer nodes occur per range ring. This allows DSSS PN code sequence reuse in different directions of the same range ring.

In summary, the key advantages of this communication system invention over previous art are its ability to be easily configured to support a large number of users with differing communication requirements over a large geographic area while largely avoiding the collision, acquisition, synchronization, and retransmission problems that plague other systems designed for similar applications.

Since a great number of nodes are supported, they are designed to be low cost and configurable for a verity of user requirements. As very few access points are required, they are designed to be easily upgraded to support future increasing quantities of nodes simply by adding additional processing, transceiver, and perhaps antenna resources.

Although the examples presented herein were for electric utilities, this invention is applicable for numerous other applications in which static nodes require low rate intermittent or continuous communications. Many simple modifications to the described system, such as time slot periods other than the GPS PPS time slot period described, are possible without departing from the spirit of the invention.

The invention claimed is:

1. A method for implementing a star topology wireless communications network, said method comprising:
   providing a central access point in wireless communication with a plurality of fixed nodes scattered over a geographical area;
   determining said access point location;
   determining each said node location;
   determining signal propagation time between said access point and each said nodes;
   implementing said wireless communication by modulating message data into message symbols using M-ary Quadrature Amplitude Modulation (M-QAM), said message symbols further modulated by a Direct Sequence Spread Spectrum (DSSS) Pseudo Random Noise (PN) code sequence;
   dividing said signal propagation time into equally separated range rings, said range rings starting at said access point and said range ring separation equal to one said DSSS PN code sequence chip period in signal propagation time and signal propagation distance;
   defining a plurality of time slots in which said wireless communication occurs;
   synchronizing said network timing, Radio Frequency (RF) transceiver frequency, and said time slots of said access point and said nodes to prevent said wireless communication message collisions; and
   implementing multiple access during said time slots based on said DSSS PN code sequence and said signal propagation time between said access point and each said nodes.

2. A method as claimed in claim 1 wherein said synchronizing is implemented using a Global Positioning System (GPS) module at said access point and at each said node, said GPS module providing time, location, and Pulse per Second (PPS) said time slot signals.

3. A method as claimed in claim 1 wherein said synchronizing is implemented by said access point transmitting a unique DSSS PN code sequence to said nodes, said nodes using said unique DSSS PN code sequence and said node location to obtain said network synchronization.

4. A method as claimed in claim 1 wherein said DSSS PN code sequence is a maximal length sequence.

5. A method as claimed in claim 1 wherein each said node DSSS modulator and demodulator clock signals are adjusted so that each said node appears to be positioned exactly at the center of said range ring in which each said node is located.

6. A method as claimed in claim 5 wherein said access point transmitted message said DSSS PN code sequence starts at said time slot and is initialized to start 1 chip later for each said range ring said node is distant from said access point, whereby propagating said transmitted message said DSSS PN code sequence is aligned with each said nodes stored local demodulation said DSSS PN code sequence.

7. A method as claimed in claim 5 wherein said access point received message stored local demodulation said DSSS PN code sequence starts at said time slot and is initialized to start 1 chip earlier for each said range ring said node is distant from said access point, whereby propagating said received message said DSSS PN code sequence is aligned with said access point stored local demodulation said DSSS PN code sequence.

8. A method as claimed in claim 1 wherein said M-QAM message symbols are encoded using a pseudo-orthogonal Quadrature Phase Shift Keying (QPSK) signal encoder and decoded using a pseudo-orthogonal QPSK signal decoder.

9. A method as claimed in claim 8 wherein said encoder input message consists of a fixed length preamble, fixed length message body, and fixed length postamble, said postamble containing said encoder zero bits used to return said encoder to its zero state.

10. A method as claimed in claim 8 wherein said decoder input message consists of an encoded fixed length preamble, encoded fixed length message body, encoded fixed length postamble, and noiseless locally generated zero symbols, said zero symbols used to eliminate all incorrect trellis decoding paths in said decoder thus identifying the correct said decoder path and correct decoded message.

11. A method as claimed in claim 1 additionally comprising implementing a wireless communication reconfiguration message transmitted from said access point to a said node, said reconfiguration message configured to select different configuration parameters of said node.

12. A method as claimed in claim 1 additionally comprising:
   implementing a said wireless communication receive only channel, said receive only channel using a unique said DSSS PN code sequence wherein said access point requests a said node message be resent from said node to said access point; and
   implementing a said wireless communication transmit only channel, said transmit only channel using a unique said DSSS PN code sequence wherein a said node requests an unscheduled message be sent from said node to said access point.

13. A method as claimed in claim 1 additionally comprising:
   encrypting a said wireless communication message using a modified One Time Pad (OTP) encryption method wherein encryption bytes are stored in an encryption memory in said access point and in each said node;
   transmitting an encryption memory offset address with each encrypted message wherein said encryption memory offset address is transmitted in clear text; and
   decrypting said encrypted message using said encryption bytes starting at said encryption memory offset address.

14. A system for implementing a star topology wireless communication network, said system comprising:
   a central access point and a plurality of fixed nodes scattered over a geographical area whose location and said wireless communication signal propagation time between said access point and each said node is known;
   a Forward Error Correction (FEC) M-ary Quadrature Amplitude Modulation (M-QAM) encoder in said access point and in said nodes for modulating message data into M-QAM data symbols;

a FEC M-QAM decoder in said access point and in said nodes for demodulating said M-QAM data symbols into said message data;
a Direct Sequence Spread Spectrum (DSSS) modulator in said access point and in said nodes for spreading said M-QAM data symbols;
a DSSS demodulator in said access point and in said nodes for despreading said M-QAM data symbols;
a Radio Frequency (RF) transceiver in said access point and in said nodes to implement said wireless communication between said access point and said nodes;
a processor in said access point and in said nodes, said processor configured to configure and control overall said access point and said nodes operation;
a network timing controller in said access point; and
a network timing controller in said nodes comprises:
  a Global Positioning System (GPS) antenna;
  a GPS module connected to said GPS antenna wherein said GPS module provides time, location, and a Pulse per Second (PPS) timing signal to define said time slots; and
  a controller circuit connected to said GPS module; and
  wherein said controller circuit creates a frequency reference for said RF transceiver;
  defines a plurality of range rings wherein said range rings start at said access point and are separated by one said DSSS PN code sequence chip; and
  provides clock signals to said DSSS modulator and said DSSS demodulator adjusted so transmissions and receptions of each said node appears to have originated or received exactly at the center of said range ring in which said node is located irrespective of said node location in said range ring; and
wherein said network timing controller in said access point and in said nodes defines time slots during which said wireless communication occurs;
synchronizes said network timing, said RF transceiver frequency, and said time slots to prevent said wireless communication message collisions; and
implements multiple access during said time slots based on said DSSS Pseudo Random Noise (PN) code sequence and said signal propagation time between said access point and said nodes.

15. A system for implementing a star topology wireless communication network, said system comprising:
a central access point and a plurality of fixed nodes scattered over a geographical area whose location and said wireless communication signal propagation time between said access point and each said node is known;
a Forward Error Correction (FEC) M-ary Quadrature Amplitude Modulation (M-QAM) encoder in said access point and in said nodes for modulating message data into M-QAM data symbols;
a FEC M-QAM decoder in said access point and in said nodes for demodulating said M-QAM data symbols into said message data;
a Direct Sequence Spread Spectrum (DSSS) modulator in said access point and in said nodes for spreading said M-QAM data symbols;
a DSSS demodulator in said access point and in said nodes for despreading said M-QAM data symbols;
a Radio Frequency (RF) transceiver in said access point and in said nodes to implement said wireless communication between said access point and said nodes;
a processor in said access point and in said nodes, said processor configured to configure and control overall said access point and said nodes operation;
a network timing controller in said access point; and
a network timing controller in each said nodes comprises:
  a Real Time Clock (RTC) circuit configured to provide network time and said time slots to said nodes;
  a DSSS timing demodulator, said timing demodulator configured to demodulate said access point continuous DSSS timing sequence wherein said DSSS timing sequence uses a unique PN code on a unique said RF transceiver frequency; and
  a controller circuit connected to said RTC circuit and said DSSS timing demodulator, said controller circuit providing said RTC circuit clock corrections, said RF transceiver frequency reference, and said DSSS modulator and demodulator timing; and
wherein said network timing controller in said access point and in said nodes defines time slots during which said wireless communication occurs;
synchronizes said network timing, said RF transceiver frequency, and said time slots to prevent said wireless communication message collisions; and
implements multiple access during said time slots based on said DSSS Pseudo Random Noise (PN) code sequence and said signal propagation time between said access point and said nodes.

16. A method for implementing multiple access in a star topology wireless communication network, said method comprising:
determining signal propagation time between a central access point and each node in said network, said each node being one of a plurality of nodes scattered over a geographical area;
modulating and demodulating message symbols using a Direct Sequence Spread Spectrum (DSSS) Pseudo Random Noise (PN) code sequence;
dividing said signal propagation time into equally spaced range rings wherein said range rings start at said access point and are separated by one said DSSS PN code sequence chip period in signal propagation time and signal propagation distance;
defining a time slot during which said wireless communication message transmissions and receptions occur;
synchronizing said network timing, frequency, and said time slot of said access point and said nodes to prevent message collisions;
placing zero or one said nodes in each of said range rings wherein each said node uses the same said DSSS PN code sequence; and
initializing modulating and demodulating said DSSS PN code sequence of one of said access point and said node, said initializing adjusting said DSSS PN code sequence to start by one chip earlier or by one chip later for each said range ring said node is distant from said access point, wherein transmitter said DSSS PN code sequence is aligned with receiver stored local said DSSS PN code sequence to account for said signal propagation time between said access point and said node at said range ring.

17. A method as claimed in claim 16 wherein said implementing multiple access further comprises defining additional said time slots.

18. A method as claimed in claim 16 wherein said implementing multiple access further comprises placing additional nodes in a said range ring containing a said node, said additional nodes each using a DSSS PN code sequence chosen to minimally cross correlate with DSSS PN code sequences used by other said nodes in said range ring.

* * * * *